(12) United States Patent
Prato

(10) Patent No.: US 11,841,055 B2
(45) Date of Patent: Dec. 12, 2023

(54) HYDRAULIC CYLINDER FOR CONTROLLING A FRICTION CLUTCH IN A MOTOR VEHICLE

(71) Applicant: RAICAM DRIVELINE S.R.L., Mondovi' (IT)

(72) Inventor: Alessio Prato, Mondovi' (IT)

(73) Assignee: Raicam Driveline S.r.l., Mondovì (IT)

(*) Notice: Subject to any disclaimer, the term of this patent is extended or adjusted under 35 U.S.C. 154(b) by 0 days.

(21) Appl. No.: 17/595,044

(22) PCT Filed: May 11, 2020

(86) PCT No.: PCT/IB2020/054420
§ 371 (c)(1),
(2) Date: Nov. 7, 2021

(87) PCT Pub. No.: WO2020/229990
PCT Pub. Date: Nov. 19, 2020

(65) Prior Publication Data
US 2022/0196084 A1    Jun. 23, 2022

(30) Foreign Application Priority Data
May 10, 2019    (IT) .................. 102019000006706

(51) Int. Cl.
*F16D 25/08* (2006.01)

(52) U.S. Cl.
CPC ...... *F16D 25/08* (2013.01); *F16D 2200/0056* (2013.01)

(58) Field of Classification Search
CPC .................. F16D 25/08; F16D 25/083; F16D 2200/0056; F16D 2025/081; F16D 2048/0212
See application file for complete search history.

(56) References Cited

U.S. PATENT DOCUMENTS

2019/0225204 A1* 7/2019 Colasanta ................. B60T 7/04

FOREIGN PATENT DOCUMENTS

| DE | 112015002795 T5 * | 3/2017 | ............ B60T 11/165 |
| DE | 112015002795 T5 | 3/2017 | |
| DE | 102016007906 A1 | 1/2018 | |

(Continued)

OTHER PUBLICATIONS

International Search Report, issued in PCT/IB2020/054420, dated Jul. 16, 2020, Rijswijk, Netherlands.

(Continued)

*Primary Examiner* — Huan Le
(74) *Attorney, Agent, or Firm* — Cittone Demers & Arneri LLP; Henry J. Cittone

(57) ABSTRACT

A hydraulic cylinder is provided which has a body forming a hydraulic chamber, in which a tubular piston made of thermoplastic material slides. An insert is locked in an internal cavity of the piston and has a spherical seat configured to receive and retain a spherical head of a rod connectable to a control pedal. The insert is made of thermoplastic material and forms a plurality of flexible fins adjacent to the spherical seat. The flexible fins have retaining elements protruding in a radially internal direction to hold the spherical head of the rod. A tensile force exerted by the rod away from the insert is transferred to a body of the piston by a stop ring.

6 Claims, 9 Drawing Sheets

(56) References Cited

FOREIGN PATENT DOCUMENTS

| EP | 1967744 | A2 | * | 9/2008 | ............. B60T 11/18 |
| EP | 1967744 | A2 | | 9/2008 | |
| WO | 2018001554 | A1 | | 1/2018 | |

OTHER PUBLICATIONS

Written Opinion Of The International Searching Authority, issued in PCT/IB2020/054420.

* cited by examiner

HYDRAULIC CYLINDER FOR CONTROLLING A FRICTION CLUTCH IN A MOTOR VEHICLE

CROSS-REFERENCE TO RELATED APPLICATIONS

This application is a National Phase Application of PCT International Application No. PCT/IB2020/054420, having an International Filing Date of May 11, 2020, claiming priority to Italian Patent Application No. 102019000006706, filed May 10, 2019 each of which is hereby incorporated by reference in its entirety.

FIELD OF THE INVENTION

The present invention pertains to the field of hydraulic control systems for a motor vehicle. The invention relates in particular to a hydraulic cylinder for controlling a friction clutch or a braking system in a motor vehicle.

BACKGROUND OF THE INVENTION

A hydraulic control system for a motor vehicle typically comprises a hydraulic master cylinder primarily formed by a body, to which a sleeve is mounted that acts as a guide for a piston. The piston is axially guided under the effect of the actuation of a rod that is connected to the piston in an articulated manner. The rod is intended to be connected to a clutch or brake pedal of the vehicle. In friction clutch systems, the master cylinder is connected, by means of a hydraulic fluid channel defined by the piston, to a receiving cylinder or slave cylinder that directly acts on the coupling or decoupling of the flywheel of the transmission on the basis of the actuation of the clutch pedal.

Patent publication WO 2018/001554 A1 discloses a master cylinder that forms a delivery chamber in which a piston may be moved between a rest position and an actuation position by means of a rod that may be connected to a control pedal. The rod comprises a spherical head that is received in a partially spherical seat of an insert secured in a tubular end of the piston. The insert forms radially external teeth that are received in seats formed in undercuts in the piston.

In other solutions, the insert that receives the spherical head of the rod is housed in an insert made of thermosetting material, which is forcibly inserted into a cavity in the piston. Thermoplastic materials are used to form the piston, which typically has an external diameter of 16 mm, thereby forming a tubular structure having a radial thickness that generally may not exceed 3-4 mm.

Another known example of hydraulic cylinder is disclosed in Patent publication US 2019/0225204 A1.

The manufacturing of thermoplastic material elements having a greater thickness leads to the appearance of surface defects that occur as a result of the thermal contraction during the cooling and solidification phase of the thermoplastic element. Typical defects that occur are localized irregularities on the outer surface of the piston, which compromise the hydraulic tightness thereof. Therefore, it is preferable to give the piston a relatively thin tubular structure in the radial direction (3-4 mm), with a relatively large internal cavity that accommodates an insert that couples to the head of the rod. The insert, having a relatively high radial thickness, is made of thermosetting material, which has reduced thermal contraction compared to a thermoplastic material. However, in order not to experience thermal contraction problems, the thermosetting insert requires finishing work, since the thermosetting material is very fluid during molding, and tends to form burrs that, in order to be removed, require additional finishing work.

SUMMARY OF THE INVENTION

The object of the present invention is to provide a hydraulic cylinder having an insert made of thermoplastic material, but without incurring the drawbacks mentioned above. Furthermore, there is a desire to provide effective axial coupling between the insert, the piston and the rod. There is also a desire to improve the production process of the insert.

The objects and advantages mentioned above and other objects and advantages that will be better understood from the following detailed description are achieved, according to one aspect of the present invention, by a hydraulic cylinder as described and claimed herein. Preferred embodiments of the hydraulic cylinder are also described.

In summary, a hydraulic cylinder comprises a body that forms a hydraulic delivery chamber that is axially elongate according to a given axis. A tubular piston made of thermoplastic material is mounted in the hydraulic chamber such that it may move axially. An insert is locked in the internal cavity in the piston and comprises a partially spherical seat that is designed to receive and hold a spherical head of a rod that may be connected to a control pedal. The insert is made of thermoplastic material. A set of elastically flexible fins are formed next to the partially spherical seat, which fins comprise retaining elements that protrude in the radially internal direction in order to hold a spherical head of a rod. A stop ring integrally mounted to the cylinder body comprises a partially spherical concave surface that faces the piston and may cooperate in a thrust relationship against a corresponding partially spherical convex surface formed by the rod. The stop ring prevents the rod from uncoupling from the hydraulic cylinder and allows the rod to oscillate with respect to said given axis. A tensile force exerted by the rod is transferred to the piston body by means of the stop ring without putting significant strain on the insert.

BRIEF DESCRIPTION OF THE DRAWINGS

A few preferred, but not restrictive, embodiments of a hydraulic cylinder according to the invention will now be described with reference to the attached drawings, in which.

DETAILED DESCRIPTION

Figure 1:
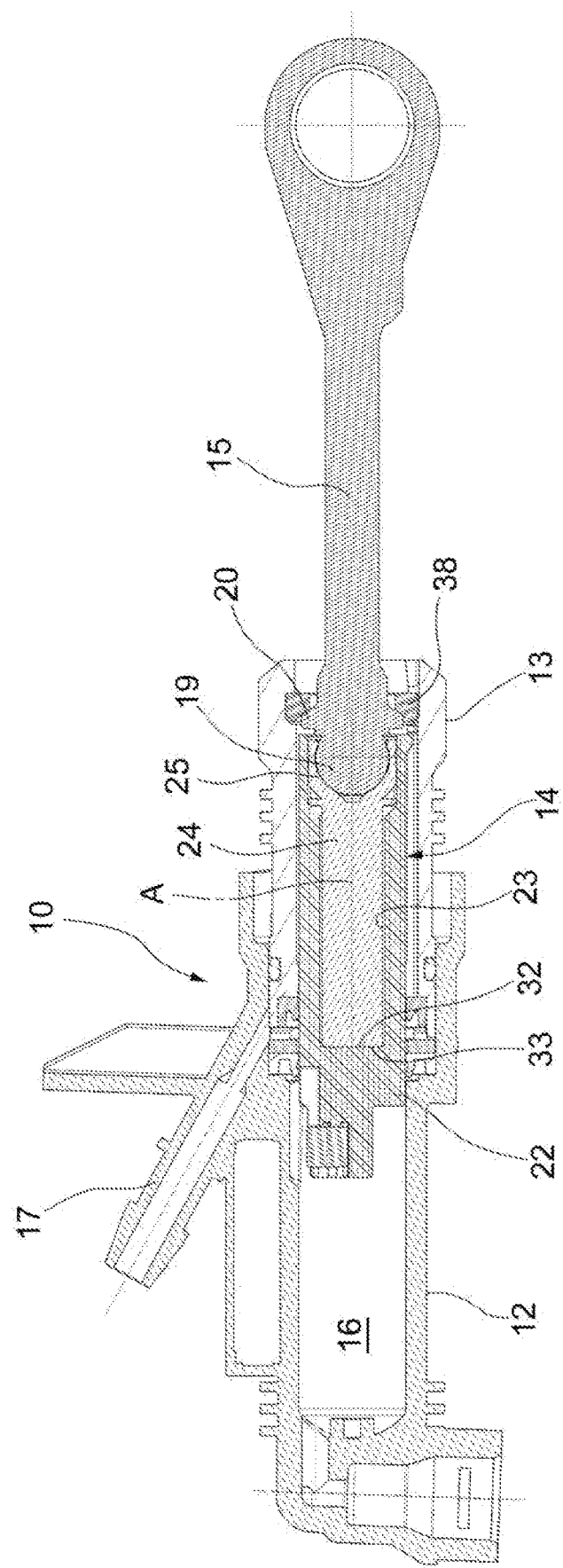
FIG. 1 is an axial sectional view of a hydraulic cylinder according to one embodiment of the invention.

Referring initially to FIG. 1, numeral 10 designates, as a whole, a hydraulic cylinder for hydraulically controlling a friction clutch system of a motor vehicle.

The hydraulic cylinder 10 is typically a master cylinder intended to be connected to a receiving or slave cylinder (not shown) by means of a hydraulic channel. The hydraulic cylinder 10 comprises a body 12 that forms a delivery chamber (or pressure chamber) 16 that is delimited by a piston 14. The piston 14 may be moved between a rest position and an actuation position by means of a rod 15 that may be connected to a control pedal (not shown) of the clutch of the vehicle. The body 12 comprises an open tubular end, in which a sleeve 13 that forms a guide for the piston 14 is fixedly mounted.

Figure 2:
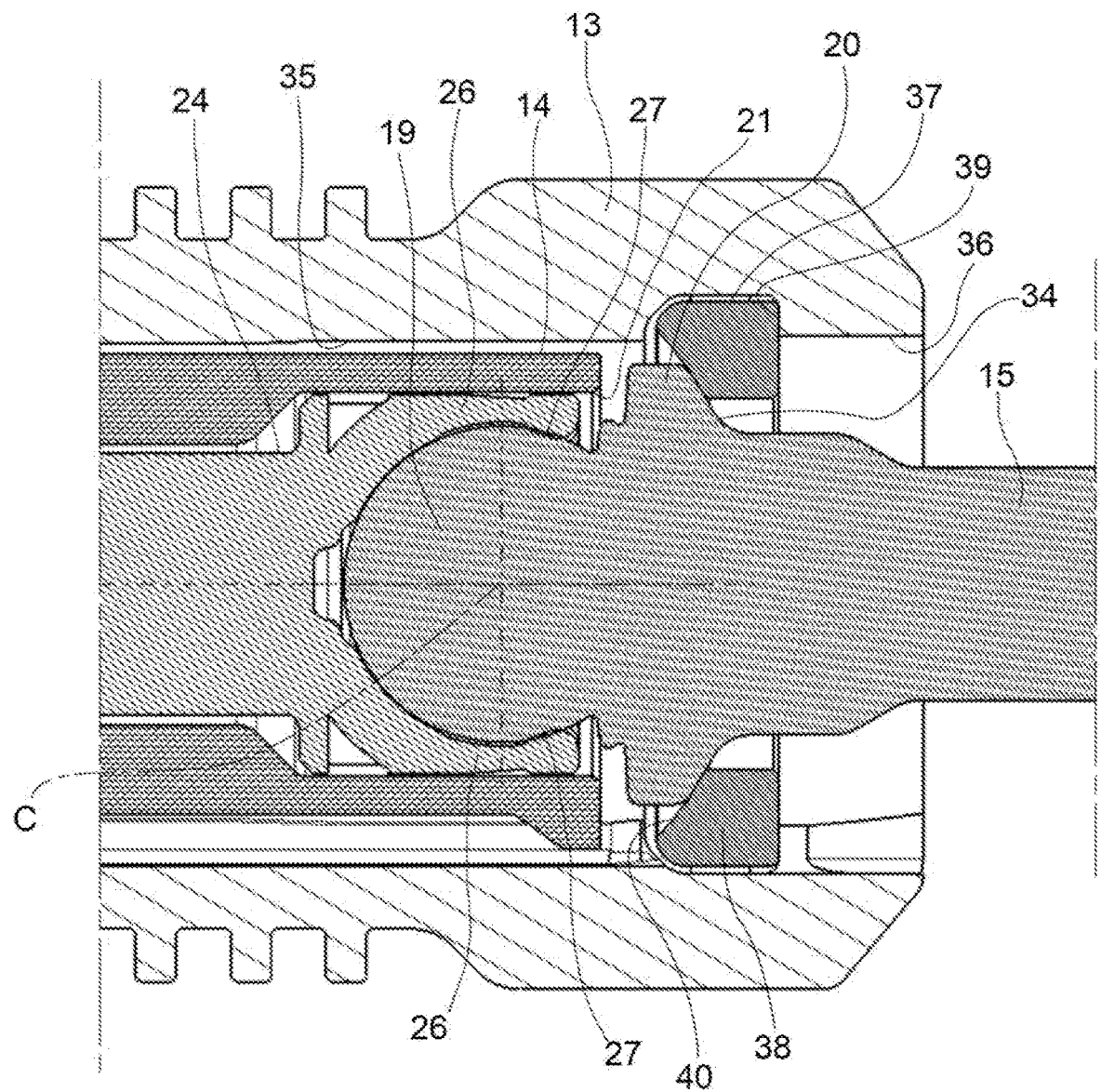
FIG. 2 is an enlarged view of part of the hydraulic cylinder in FIG. 1.

The piston 14 of the hydraulic cylinder is coupled to the rod 15 axially integrally by means of a ball joint such that the rod may move the piston 14 axially along a longitudinal axis A of the body 12, thereby simultaneously allowing for relative rotational movements between the rod 15 and the piston 14. The rod 15 comprises an end that forms an end spherical head 19 and, adjacent to the end spherical head 19, a radial flange 20 (FIG. 2) that comprises a partially spherical convex surface 34. The convex surface 34 faces away from the spherical head 19 and comprises a geometric center C that coincides with or substantially coincides with the center of the end spherical head 19. The hydraulic cylinder may be intended to act directly on the coupling or decoupling of the flywheel of the transmission on the basis of the actuation of the clutch pedal. Furthermore, the body 12 of the hydraulic cylinder may comprise a tube 17 for connecting a compensation tube.

As intended here, terms and expressions indicating orientations such as "longitudinal" or "axial" and "transverse" or "radial" shall be construed as referring to the longitudinal axis A of the body 12 of the hydraulic cylinder.

The sleeve 13 is longitudinally integral with the body 12 and forms a longitudinal through-cavity 35 that receives the piston 14. The cavity 35 in the sleeve comprises one end 36, defined here as the front end, which is arranged on the side of the rod 15, through which the piston 14 and the end part of the rod 15 are introduced, in particular the spherical head 19 and the flange 20. An enlarged annular seat 37 is made in the longitudinal cavity 35 adjacently to the front end 36, which seat receives a stop ring 38. The enlarged annular seat 37 comprises a transverse shoulder 39 that constitutes a longitudinal abutment surface for the stop ring 38. The stop ring 38 is used to prevent the rod 15 from decoupling from the hydraulic cylinder 10.

The stop ring 38 may advantageously be formed as an open ring in order to facilitate mounting thereof around the rod 15 and in the enlarged annular seat 37 of the sleeve 13.

The stop ring 38 comprises a partially spherical concave surface 40, which faces and cooperates with the convex surface 34 of the flange 20. The concave surface 40 preferably has a radius corresponding to the radius of the convex surface 34 so as to allow for and optimize relative oscillatory movements between the rod 15 and the hydraulic cylinder 10.

Figure 3:
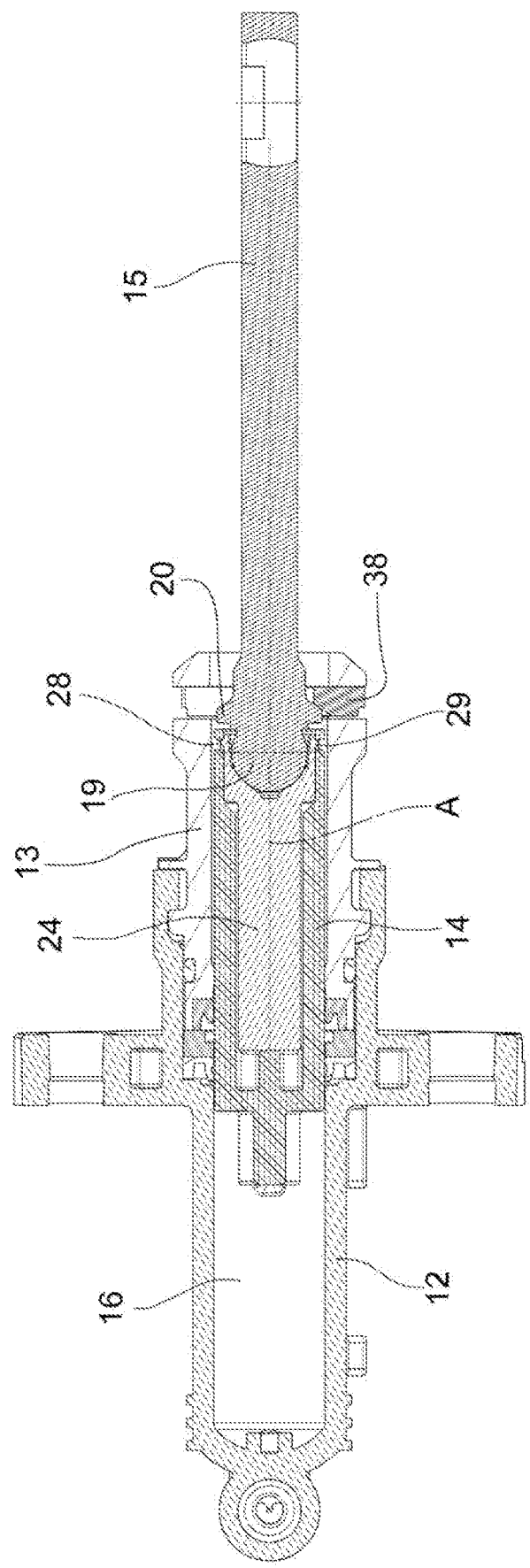
FIG. 3 is an axial sectional view of the hydraulic cylinder according to an axial sectional plane that is perpendicular to that in FIG. 1.

The piston 14 has an overall tubular shape, with a closed rear end 22 towards the pressure chamber 16 (on the left in FIGS. 1 and 3), and an open front end (on the right in FIGS. 1 and 3) that faces the rod 15.

The piston 14 provides an internal cavity 23 that is open at the front end, into which an insert 24 having a longitudinally elongate shape is inserted and locked. The cavity 23 in the piston 14 provides an opening at the front, which has a circular edge 21 and through which the insert 24 is inserted.

The insert 24 comprises a front end comprising a partially spherical seat 25 having a center C that may receive the spherical head 19 of the rod 15, a plurality of elastically flexible fins 26 in axial planes that are equally spaced apart at an angle around the longitudinal axis A, and a plurality of retaining elements 27 in the form of teeth protruding in radially internal directions from some or all of the flexible fins.

According to an embodiment, one, two or more flexible fins 26, which are suitably arranged in positions that are spaced apart at an angle with respect to the longitudinal axis A, may comprise a particular locking tooth 28 that protrudes in the radially external direction. The or each external locking tooth 28 is intended to be snapped into a corresponding through-opening 29 formed near the front end of the piston 14.

Each external locking tooth 28 comprises an abutment face 30 that lies on a radial or transverse plane for abutting a corresponding radial or transverse face 31 that is formed by the corresponding through-opening 29.

The external locking teeth 28 may suitably be designed as spears or saw-teeth, each comprising an outer rear surface 32 that is inclined rearwardly and centrally towards the longitudinal axis A, in order to facilitate entry of the insert 24 into the cavity 23 in the piston through the front circular edge 21 of the piston.

Advantageously, the through-opening(s) 29 are designed as through-slits made on a radial or transverse geometric plane that is perpendicular to the longitudinal axis A.

The through-openings 29 are preferably formed as through-slits having limited circumferential extensions.

The insert 24 preferably has a longitudinal dimension that corresponds to the longitudinal dimension of the cavity 23, such that a rear end surface 32 of the insert abuts a rear bottom surface 33 of the cavity 23 in the piston when the insert is fully inserted into the cavity 23. When the pedal pushes the insert to the left by means of the rod 15 during actuation of the clutch, the contact between the abutting surfaces 32, 33 produces the movement of the piston, thereby allowing it to enter the pressure chamber 16. Vice versa, the release of the rod 15 from the piston 14 is opposed by the abutment of the surfaces 30 of the external teeth 28 and the oppositely facing surfaces 31 of the through-openings 29.

The piston 14 and the insert 24 are made of thermoplastic material. The action of the external teeth 28 engaging in and being held in the through-openings 29 ensures stable and reliable longitudinal or axial coupling between the piston and the rod. It is not necessary for the insert to be of such a thickness that the cavity 23 is filled up in order to ensure the longitudinal coupling to the piston; therefore, the insert 24 may also advantageously be made of thermoplastic material.

Figure 4:
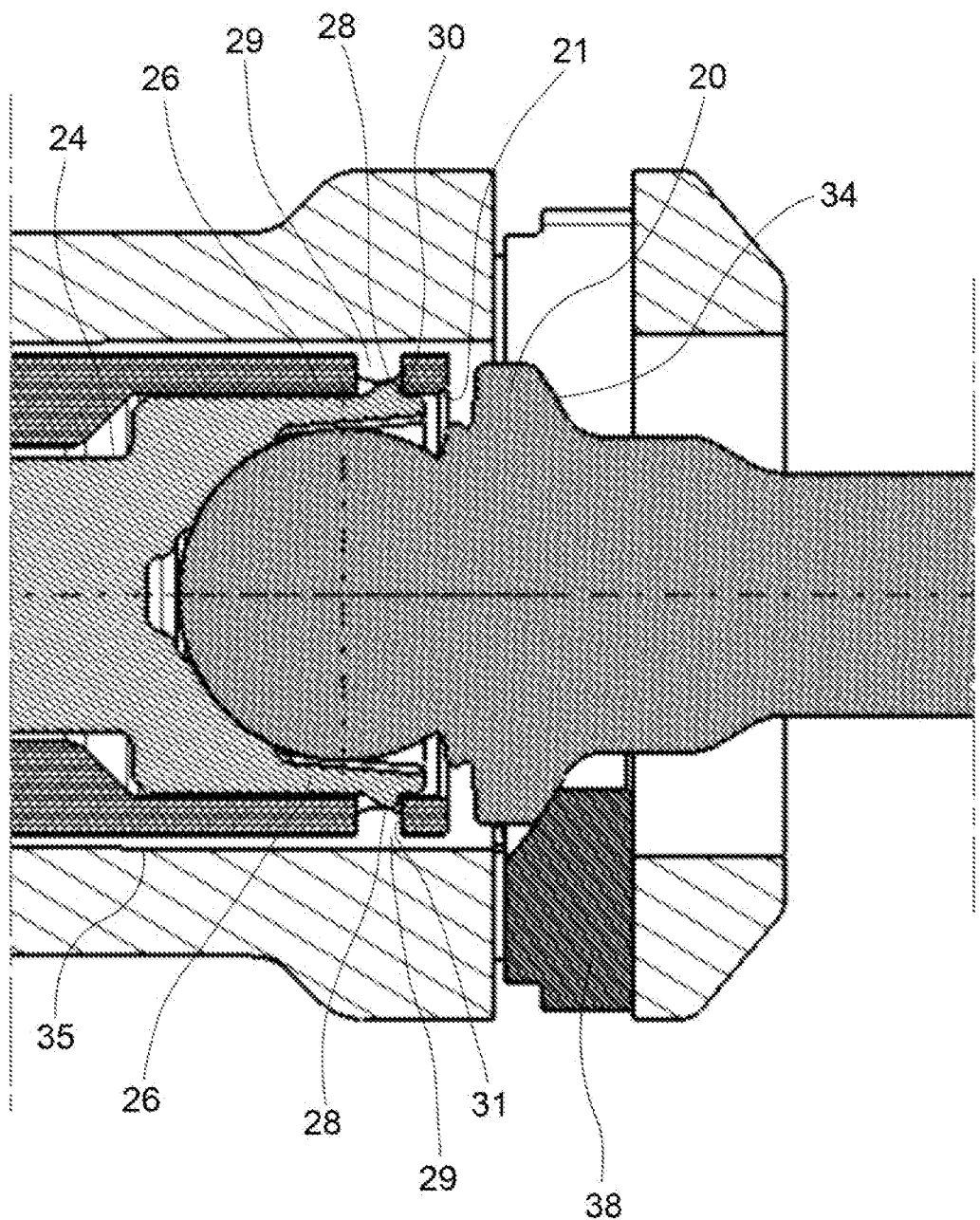
FIG. 4 is an enlarged view of part of the hydraulic cylinder in FIG. 3.
Figure 5:
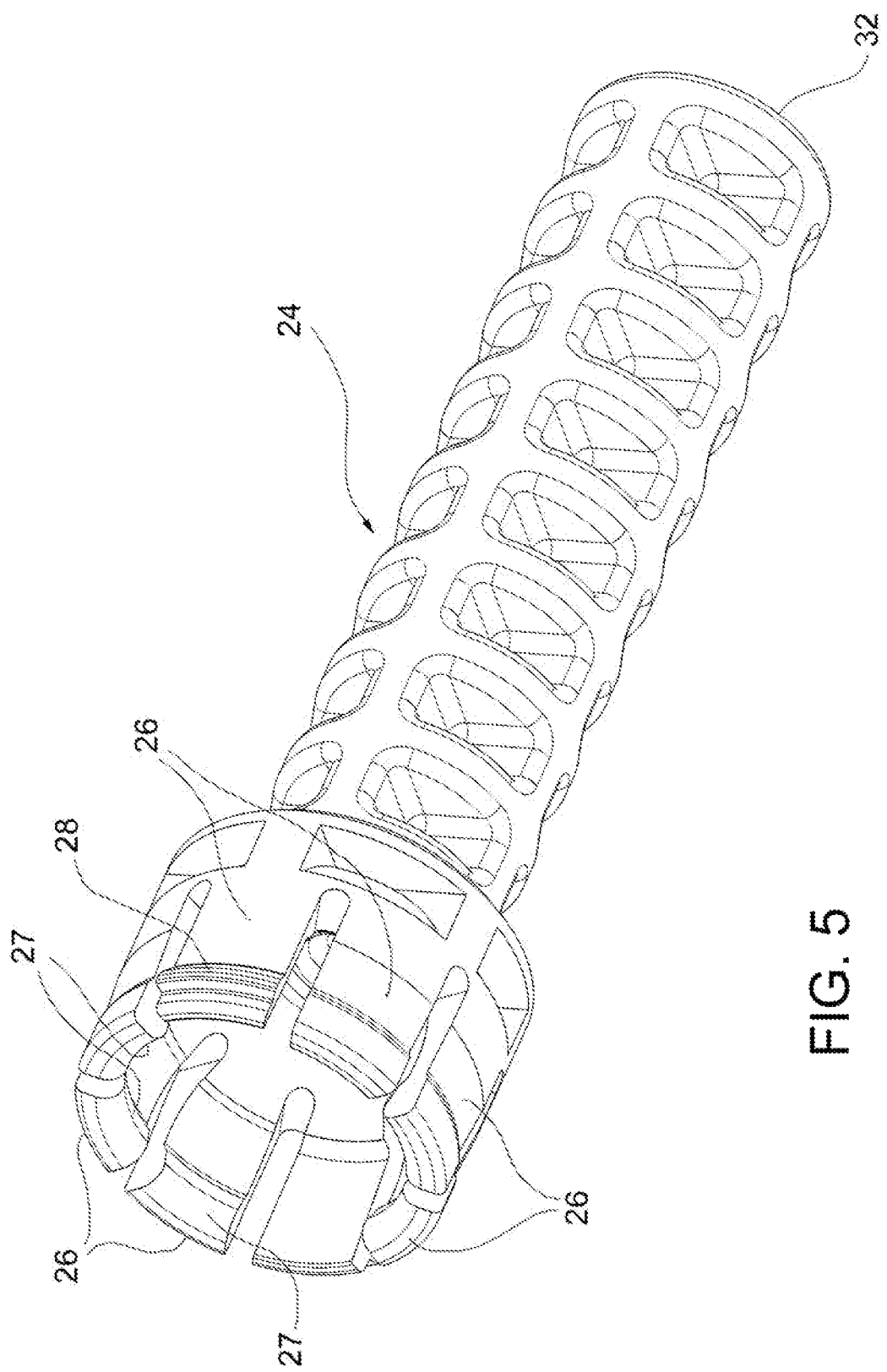
FIG. 5 is a perspective view of an insert forming part of the hydraulic cylinder in FIG. 1-4.
Figure 6:
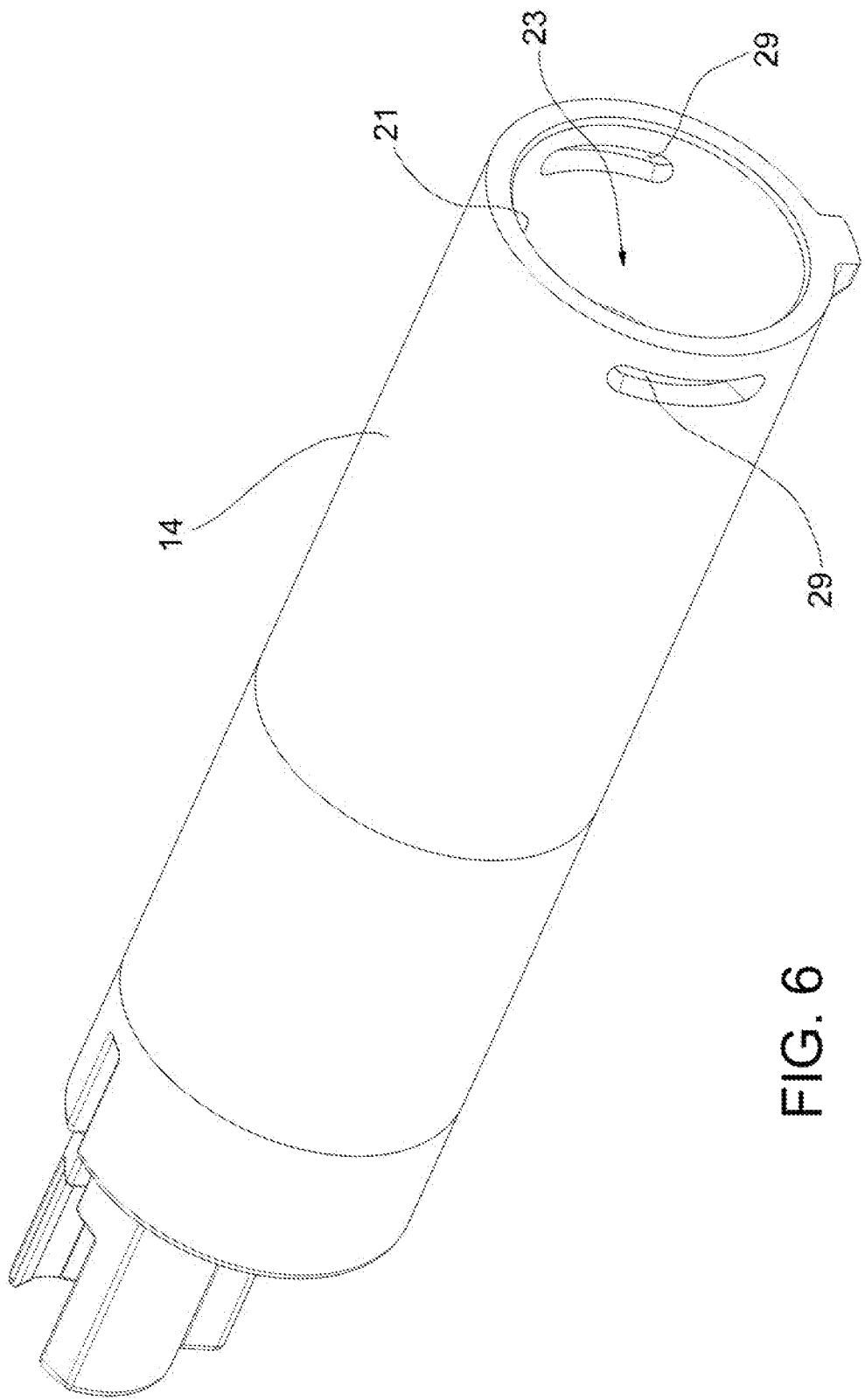
FIG. 6 is a perspective view of a piston forming part of the hydraulic cylinder in FIG. 1-4.
Figure 7:
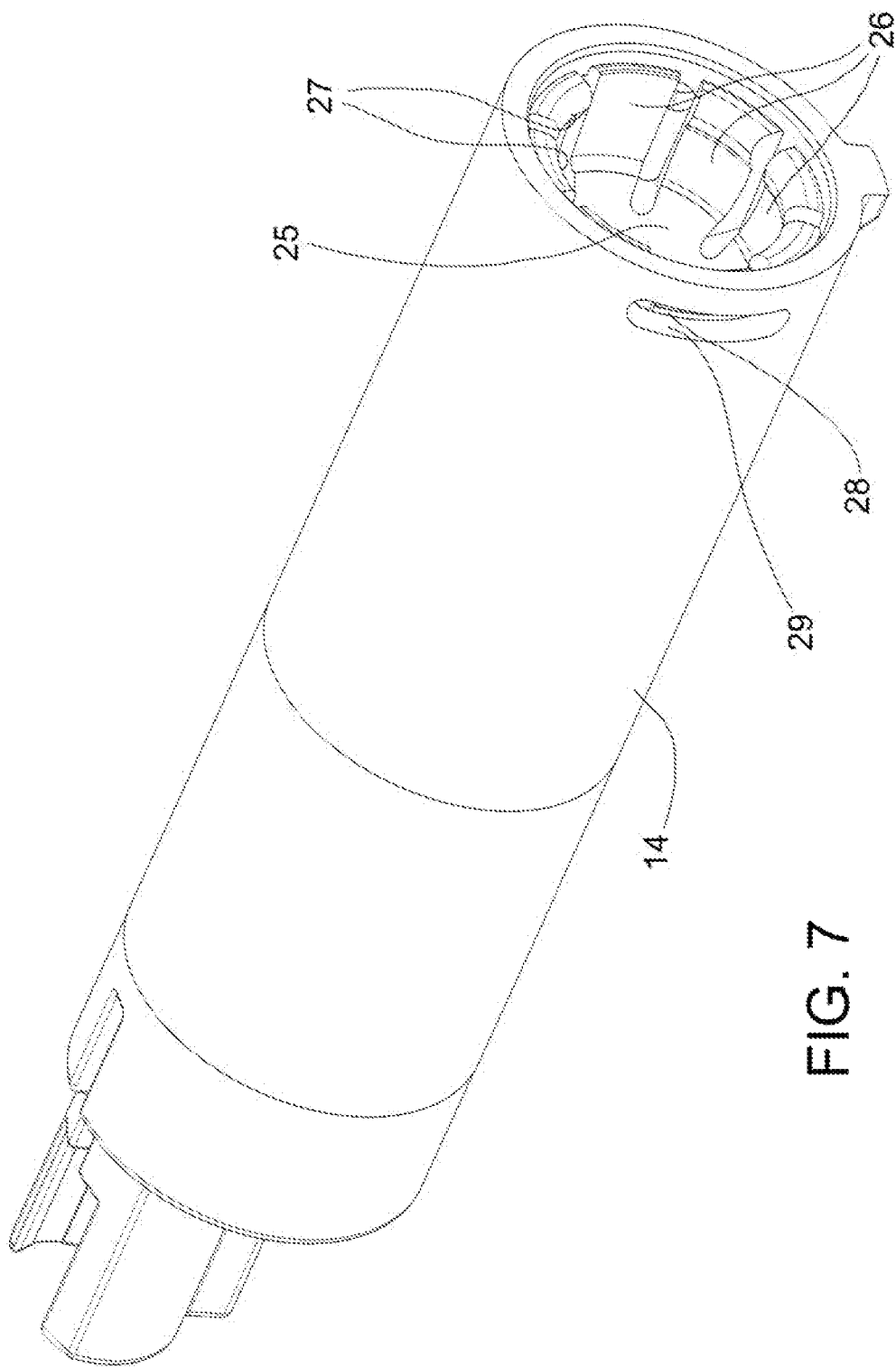
FIG. 7 is a perspective view of the piston in FIG. 6, into which the insert in FIG. 5 is inserted.
Figure 8:
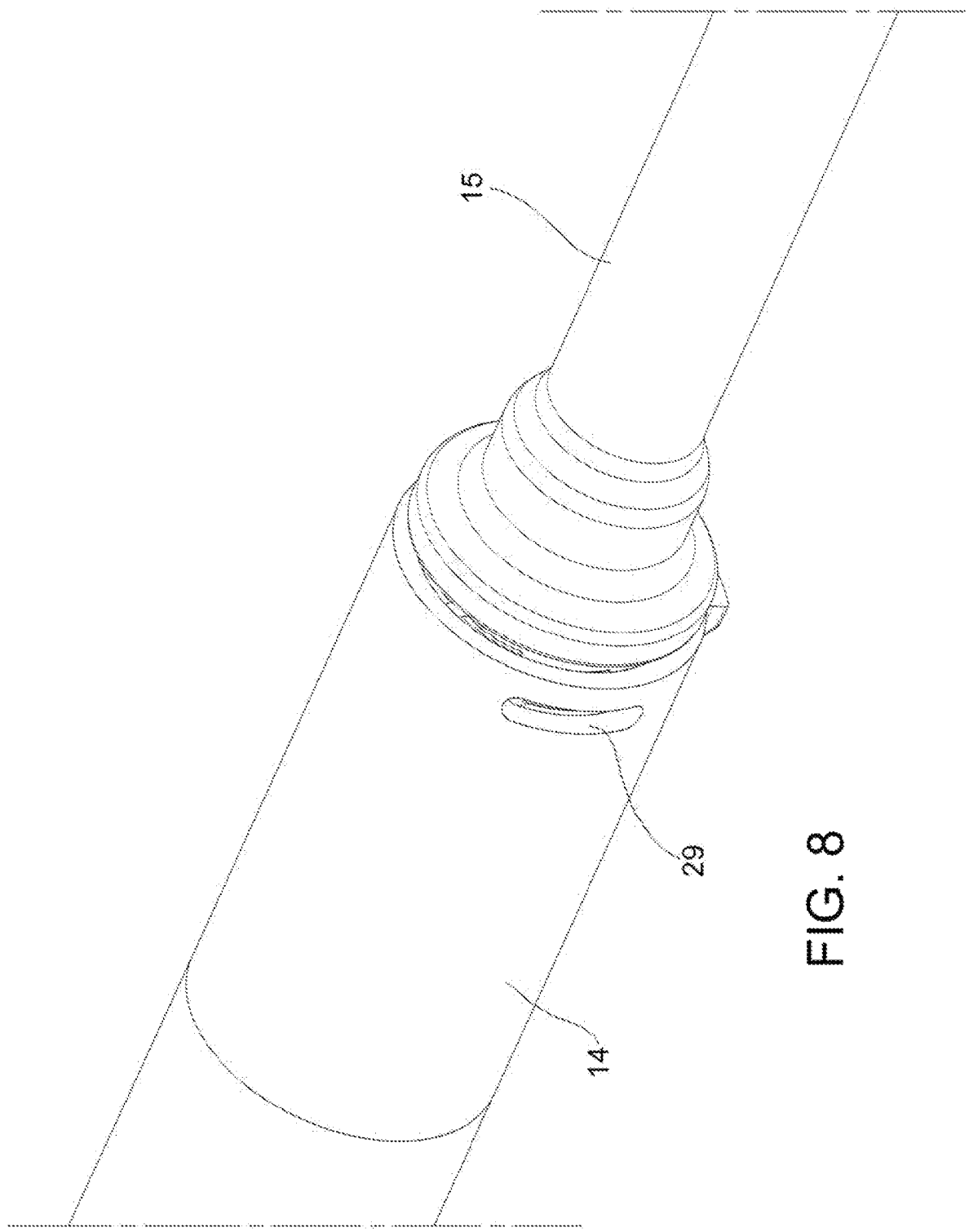
FIG. 8 is a perspective view of the piston in FIG. 7 coupled to the rod of a pedal control system.

According to a preferred embodiment (FIG. 4), the or each through-opening 29 is formed through the piston 14 in a longitudinal position that is directly in front of the position of maximum diameter of the spherical seat 25. The position of maximum diameter of the spherical seat 25 corresponds to the axial position taken by the maximum diameter of the spherical head 19 of the rod in the mounted condition. This relative axial or longitudinal position favors the stability of the axial coupling between the rod, the insert and the piston. In fact, a tensile force applied by moving the rod to the front (to the right in FIGS. 1-4) causes the flexible fins 26 to open with the consequent expansion thereof in radially external directions and further penetration and engagement of the teeth 28 in the through-openings 29.

Alternatively, or in addition to the cooperation between the teeth 28 and the openings 29, the diameter or transverse dimension D24 (FIG. 9) of the insert 24 may be sized so as to lock the insert 24 by radial interference in the internal cavity 23 in the piston 14 (which has a diameter D14).

The absence of conventional undercuts makes it possible to form radial or transverse surfaces 30, 31 that face one another and have larger radial or transverse extensions, since there is not the problem of forcibly extracting the insert from the forming mold. The through-openings 29 may be formed during molding using a pair of radially extractable carriages.

Figure 9:
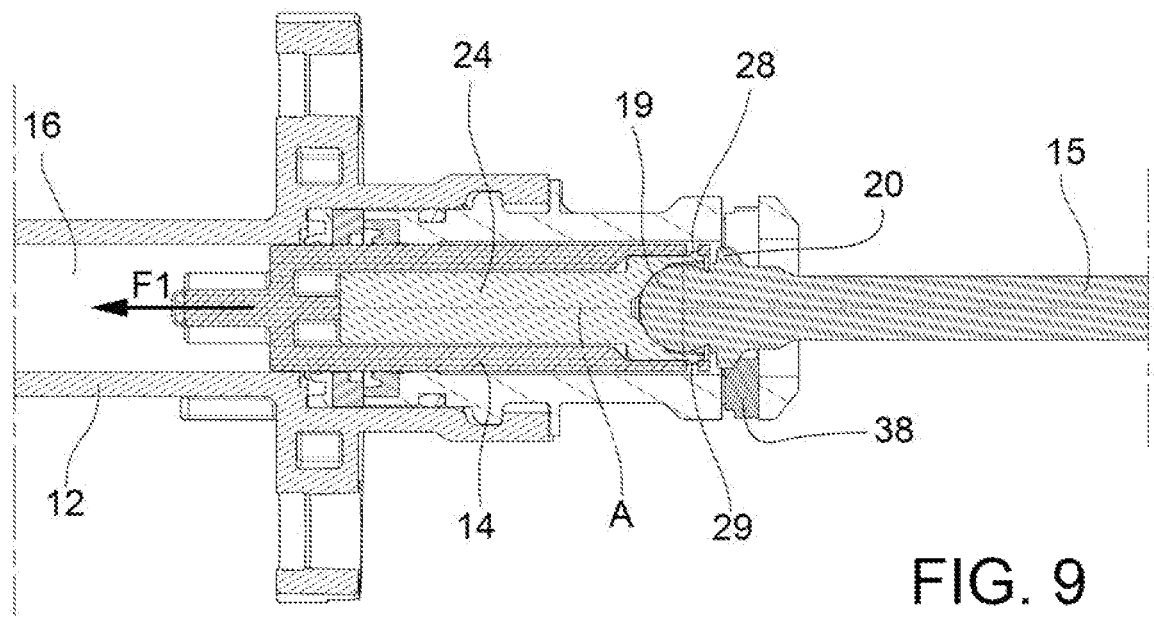
FIGS. 9 and 10 are similar views to FIGS. 3 and 2, respectively, schematically showing forces.
Figure 10:
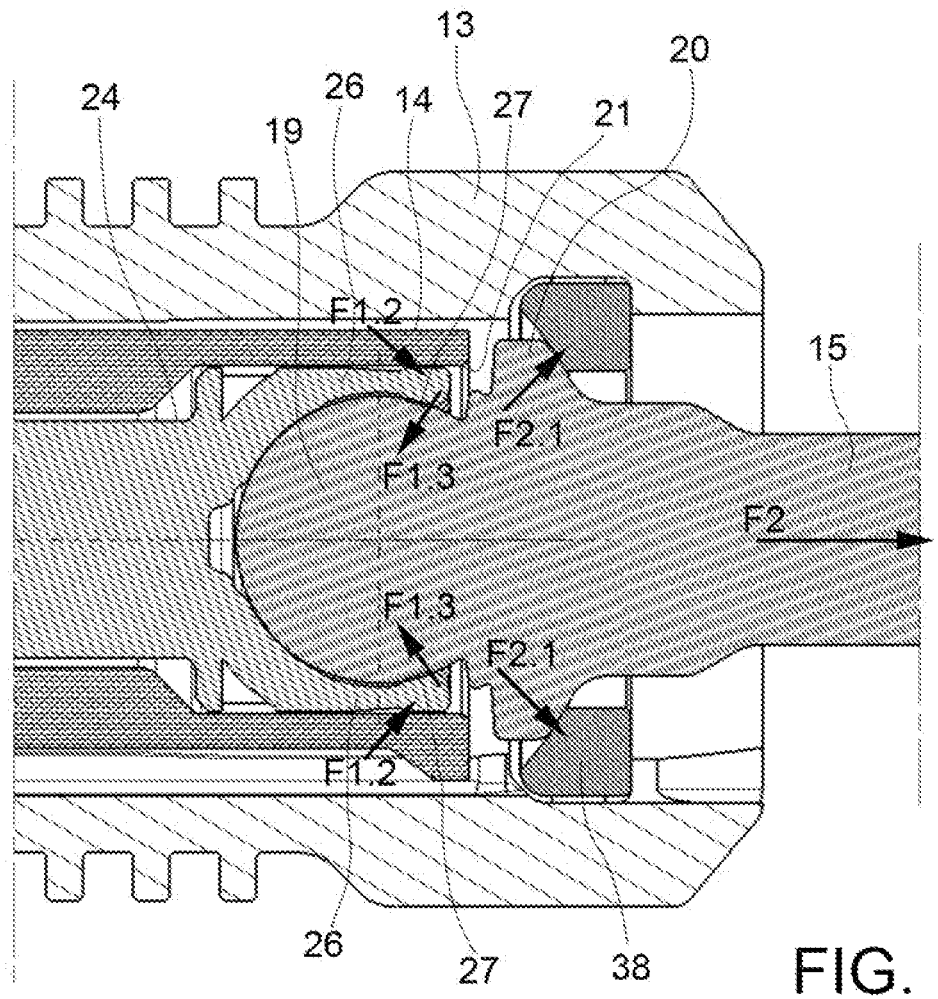

With reference to FIGS. 9 and 10, during assembly, there is initially a vacuum in chamber 16, and therefore the piston 14 undergoes a thrust movement F1 of approximately 60 N to the left, thereby moving the insert 24 by means of the forces F1.2. The insert 24, together with the internal retaining elements 27, grasps the spherical head 19 by exerting radial forces F1.3.

Subsequently, when the clutch pedal is released or raised and the rod 15 is pulled to the right (FIG. 10), the tensile force F2 exerted by the rod 15 is transferred to the body 12 by means of the flange 20, the stop ring 38 and the sleeve 13, without putting considerable strain on the insert 24. In FIG. 10, F2.1 indicates the forces transmitted through the surface 34 of the flange 20 and the surface 40 of the stop ring 38, which are aligned.

During normal operation of the hydraulic cylinder, the axial thrust of the rod 15 to the left is transmitted from the spherical head 19 to the insert 24 and therefore to the piston 14 through the aligned surfaces 32 and 33. During the release or return phase (to the right), the pressure in the hydraulic chamber 16 keeps the surfaces 32 and 33 in abutment and therefore pushes the rod 15 to the right, by means of the insert 24, for the majority of the return stroke. During the final part of the return stroke—zero pressure or slightly negative pressure—in addition to the frictional forces between the piston 14 and the body 12 and gaskets arranged therebetween, the piston is axially integral with the rod 15 due to the internal retaining elements 27 and the external retaining elements 28 and/or the radial interference between the insert 24 and the piston 14.

Various aspects and embodiments of the hydraulic cylinder have been described; each embodiment is intended to be combinable with any other embodiment. Furthermore, without prejudice to the principle of the invention, the embodiments and implementation details may be extensively modified with respect to that described and illustrated purely by way of non-limiting example, without thereby departing from the scope of the invention, as defined in the appended claims.

The invention claimed is:

1. A hydraulic cylinder for controlling a friction clutch, the hydraulic cylinder comprising:
   a body forming a hydraulic delivery chamber that is axially elongate according to a longitudinal axis (A);
   a tubular piston made of thermoplastic material and mounted axially movable in the hydraulic delivery chamber, the tubular piston comprising a first end closed towards the hydraulic delivery chamber, and an axially elongate internal cavity open at a second end that is opposite the first end;
   an insert having an axially elongate shape, which is inserted into and locked in the axially elongate internal cavity of the tubular piston, the insert comprising an end providing a partially spherical seat housed in the second end of the axially elongate internal cavity and configured to receive and retain a spherical head of a rod; and
   a plurality of elastically flexible fins in axial planes that are spaced apart at an angle around the longitudinal axis (A), wherein the elastically flexible fins are formed by the insert and comprise a plurality of internal retaining elements that protrude in radially inner directions to retain the spherical head of the rod in the partially spherical seat of the insert; wherein
   the insert is made of thermoplastic material;
   the insert has a longitudinal size corresponding to the longitudinal size of the axially elongate internal cavity such that an end surface of the insert abuts a bottom surface of the axially elongate internal cavity in the tubular piston when the insert is fully inserted into the axially elongate internal cavity; wherein
   the hydraulic cylinder further comprises:
   a guide sleeve that is integral with the body and comprises an axial through-cavity, said axial through-cavity being axially aligned with the hydraulic delivery chamber and housing the tubular piston so that the piston may move axially, and
   a stop ring that is mounted in an axial stop seat formed at one end of the axial through-cavity in the guide sleeve, the stop ring comprising a partially spherical concave surface facing the tubular piston and cooperating in a thrust relationship against a corresponding partially spherical convex surface formed by the rod, whereby the stop ring prevents the rod from uncoupling from the hydraulic cylinder and allows the rod to oscillate with respect to said longitudinal axis (A), and wherein
   at least one of said elastically flexible fins provides an external locking element for snapping into at least one through-opening adjacent to the second end of the tubular piston,
   each external locking element provides an abutment surface that lies on a radial plane for abutting a corresponding radial surface formed by a corresponding through-opening, and
   said at least one through-opening or each through-opening is formed through the tubular piston in an axial position that is closer to the second end of the tubular piston than the axial position of maximum diameter of the partially spherical seat.

2. The hydraulic cylinder of claim 1, wherein each external locking element a is saw-tooth shaped—and comprises an outer surface that is centrally inclined towards said longitudinal axis (A) and towards an axial end of the insert that is opposite the end that provides the partially spherical seat.

3. The hydraulic cylinder of claim 1, wherein the axial stop seat is an enlarged annular seat formed adjacently to a front end of the axial through-cavity and comprises a transverse shoulder providing a longitudinal abutment surface for the stop ring.

4. The hydraulic cylinder of claim 1, wherein the stop ring is formed as an open ring.

5. The hydraulic cylinder of claim 1, wherein the insert is locked by radial interference in the axially elongate internal cavity of the tubular piston.

6. The hydraulic cylinder of claim 1, wherein the elastically flexible fins extend from the partially spherical seat.

* * * * *